US00RE36003E

United States Patent [19]

Sato

[11] E Patent Number: Re. 36,003

[45] Reissued Date of Patent: Dec. 22, 1998

[54] OCCUPANT RESTRAINT SYSTEM

[75] Inventor: Izumi Sato, Fuji, Japan

[73] Assignee: Nihon Plast Co., Ltd., Fuji, Japan

[21] Appl. No.: 787,128

[22] Filed: Jan. 24, 1997

Related U.S. Patent Documents

Reissue of:

[64] Patent No.: 5,383,681
Issued: Jan. 24, 1995
Appl. No.: 122,651
Filed: Sep. 17, 1993

[30] Foreign Application Priority Data

Sep. 29, 1992 [JP] Japan ..... 4-259656

[51] Int. Cl.[6] ..... B60R 21/20

[52] U.S. Cl. ..... 280/728.3

[58] Field of Search ..... 280/728.3, 731, 280/732, 730.1, 728.2, 728.1

[56] References Cited

U.S. PATENT DOCUMENTS

| | | | |
|---|---|---|---|
| 4,148,503 | 4/1979 | Shiratori et al. | 280/731 |
| 4,878,689 | 11/1989 | Mitzukus et al. | 280/728.3 |
| 4,903,986 | 2/1990 | Cok et al. | 280/731 |
| 5,085,461 | 2/1992 | Shibata | 280/731 |
| 5,183,289 | 2/1993 | Zeller et al. | 280/728.3 |
| 5,201,541 | 4/1993 | Jones et al. | 280/731 |
| 5,280,946 | 1/1994 | Adams et al. | 280/728.3 |
| 5,286,055 | 2/1994 | Zushi | 280/728.3 |

FOREIGN PATENT DOCUMENTS

| | | | |
|---|---|---|---|
| 551732 | 7/1993 | European Pat. Off. | 280/731 |
| 53-24693 | 7/1978 | Japan . | |
| 58-64945 | 4/1983 | Japan . | |
| 4-15145 | 1/1992 | Japan | 280/728.3 |
| 4-27638 | 1/1992 | Japan . | |

*Primary Examiner*—Peter C. English
*Attorney, Agent, or Firm*—Foley & Lardner

[57] ABSTRACT

An occupant restraint system includes a box-like container having a base wall and side walls joined to the base wall and a folded inflatable cushion within the container. Tear lines in the form of a groove are formed on the base wall so as to define a pair of tongues forcibly separable from the container and a pair of flaps integrally hinged to the tongues and forcibly separable from the container for movement between a normally closed position and an open position upon inflation and deployment of the cushion. The tongues and flaps are located substantially entirely within the base wall and are separable from the container and movable to the open position so as to permit deployment of the cushion through the base wall.

27 Claims, 8 Drawing Sheets

OCCUPANT RESTRAINT SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an occupant restraint system, and more specifically to a container for housing an inflatable folded cushion of the occupant restraint system.

Occupant restraint systems of the above type are well known and are disclosed in Japanese Patent Application First Publication No. 4-27638, Japanese Patent Application Second Publication No. 53-24693, and U.S. Pat. Nos. 4,148,503 and 4,903,986.

Among them, Japanese Patent Application First Publication No. 4-27638 discloses a container for accommodating a folded inflatable cushion. The container is of a generally box shape and includes a base wall and side walls joined to the base wall. Tear lines in the form of intermittent slits are disposed on the base wall to define an integrally hinged pair of flaps which are forcibly separable from the container upon inflation and deployment of the cushion. Stop holes are arranged to prevent excessive separation beyond the ends of the tear lines.

An object of the present invention is to improve an occupant restraint system such that a folded cushion container opens quickly and widely to assure sufficient deployment of the folded cushion.

SUMMARY OF THE INVENTION

According to one aspect of the present invention, there is provided an occupant restraint system comprising:

- a container including a base wall, a first pair of spaced side walls Joined to the base wall, and a second pair of spaced side walls joined to the base wall;
- a folded inflatable occupant restraint cushion within the container, the cushion being folded to provide a cushion portion opposite the base wall of the container; and
- means in the base wall of the container for defining an integrally hinged pair of tongues forcibly separable from the container and a pair of flaps integrally hinged to the pair of tongues and forcibly separable from the container for movement between a normally closed position and an open position upon inflation and deployment of the cushion;
- the pair of tongues and the pair of flaps being located substantially entirely within the base wall and being separable from the container and movable to the open position by the cushion portion of the inflatable cushion to permit deployment of the cushion through the-base wall of the container.

DESCRIPTION OF THE PREFERRED EMBODIMENT

Figure 1:
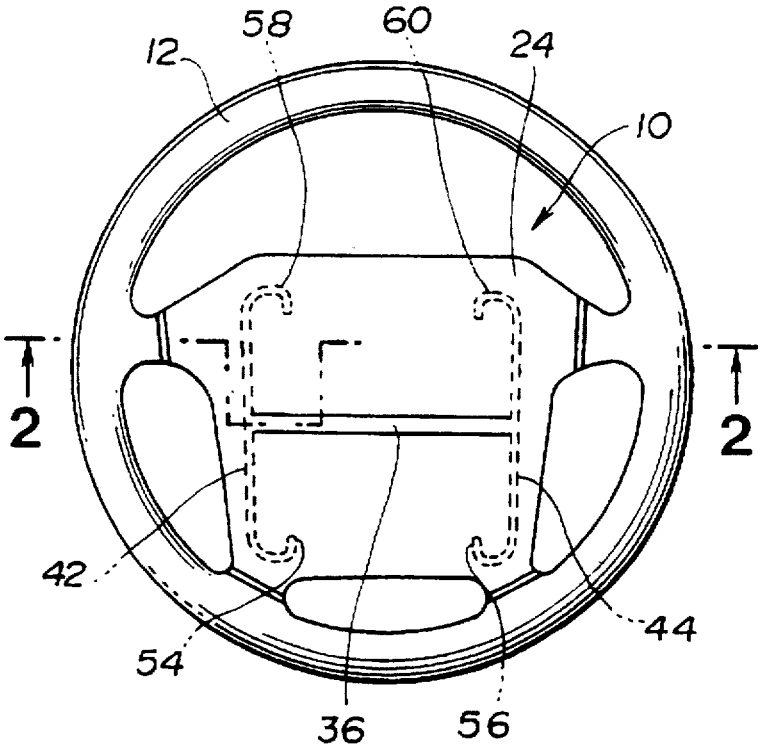
FIG. 1 is a schematic top plan view of an occupant restraint system according to the present invention, which is installed on a steering wheel.
Figure 3:
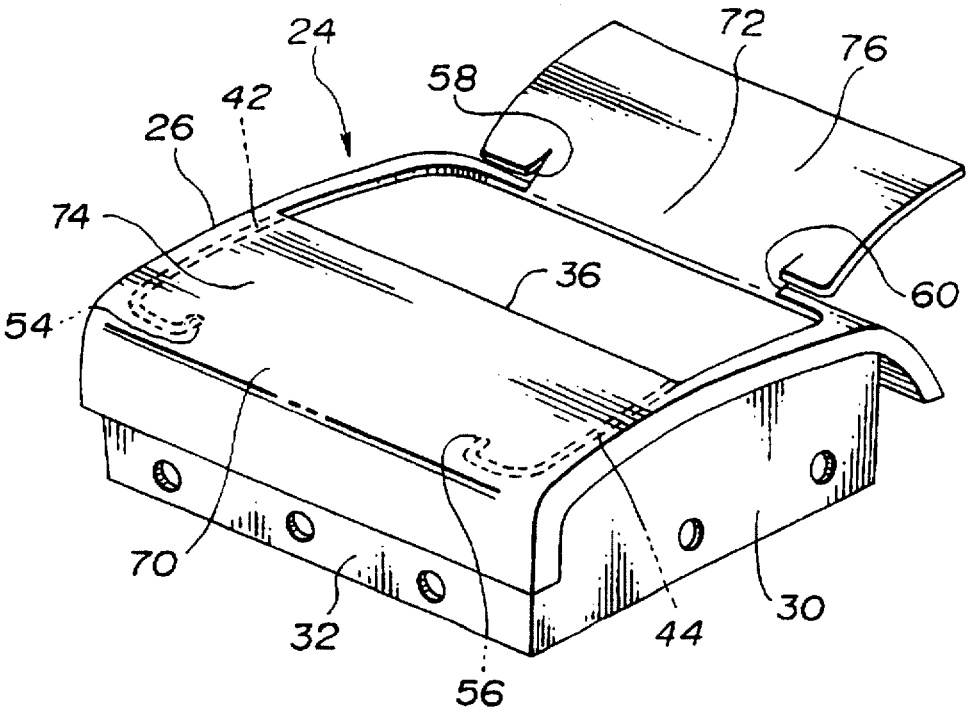
FIG. 3 is a perspective view of a container of the occupant restraint system, showing one flap of a pair in an open position.
Figure 2:
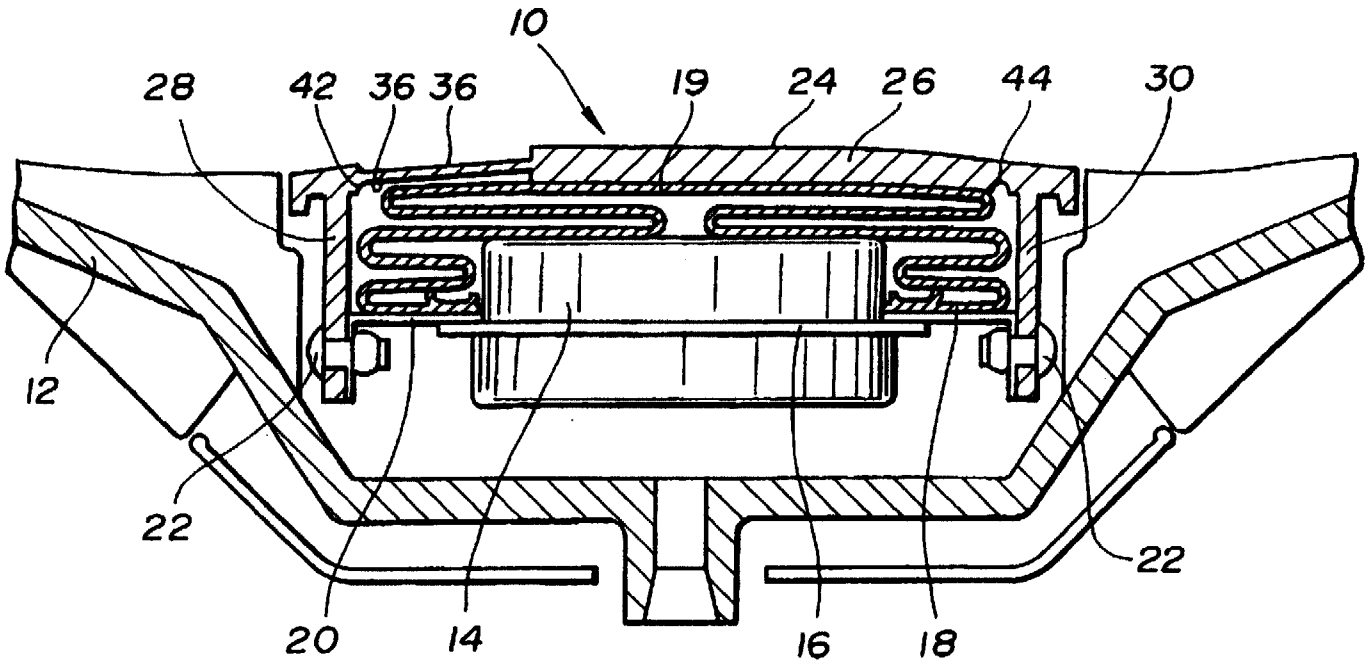
FIG. 2 is an enlarged sectional view taken along the line 2—2 of FIG. 1.
Figure 5:
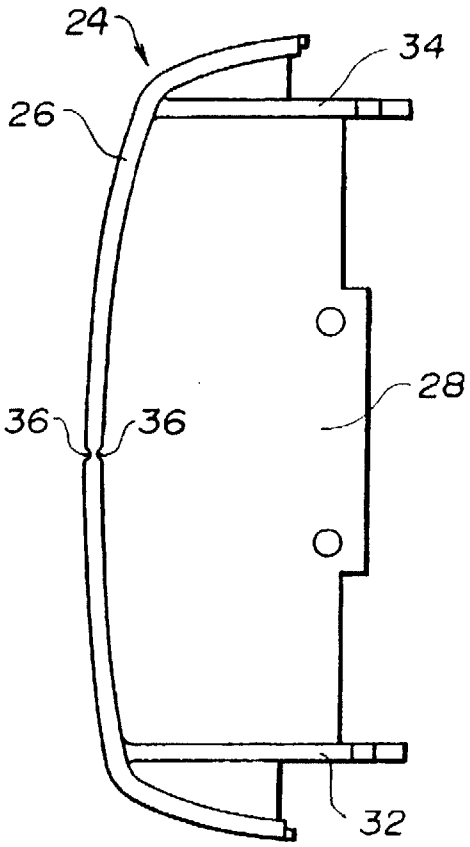
FIG. 5 is a sectional view taken along the line 5—5 of FIG. 4.

Referring now to FIG. 1, there is shown an occupant restraint system 10 mounted in a conventional manner to a hub portion of a vehicle steering wheel 12. As shown in FIG. 2, the occupant restraint system 10 includes a gas generator 14 formed with a flange 16 to which an inflatable cushion 18 is secured through a bracket 20. The bracket 20 is secured by means of screws 22 to two pairs of spaced side walls 28, 30 and 32, 34 of a container 24, one pair 28 and 30 of which are seen in FIG. 2. The cushion 18 is folded in the container 24 to provide a cushion portion 19 opposite to a base wall 26 of the container 10 as seen in FIG. 2. The folded cushion 18 surrounds the gas generator 14 and is inflatable by gas from the gas generator 14.

The container 24 is made of a thermoplastic resin material, such as polypropylene, ABS, thermoplastic polyurethane and polyvinyl chloride, preferably thermoplastic polyolefine elastomer, which are relatively high in hardness so that the container 24 has an appropriate rigidity. As shown in FIGS. 2 to 6, the container 24 is of a generally box shape and includes the generally trapezoidal base wall 26 and the two pairs of spaced side walls 28, 30 and 32, 34. The side walls 28, 30, 32 and 34 are joined to an inner surface of the base wall 26 and to each other.

Figure 6:
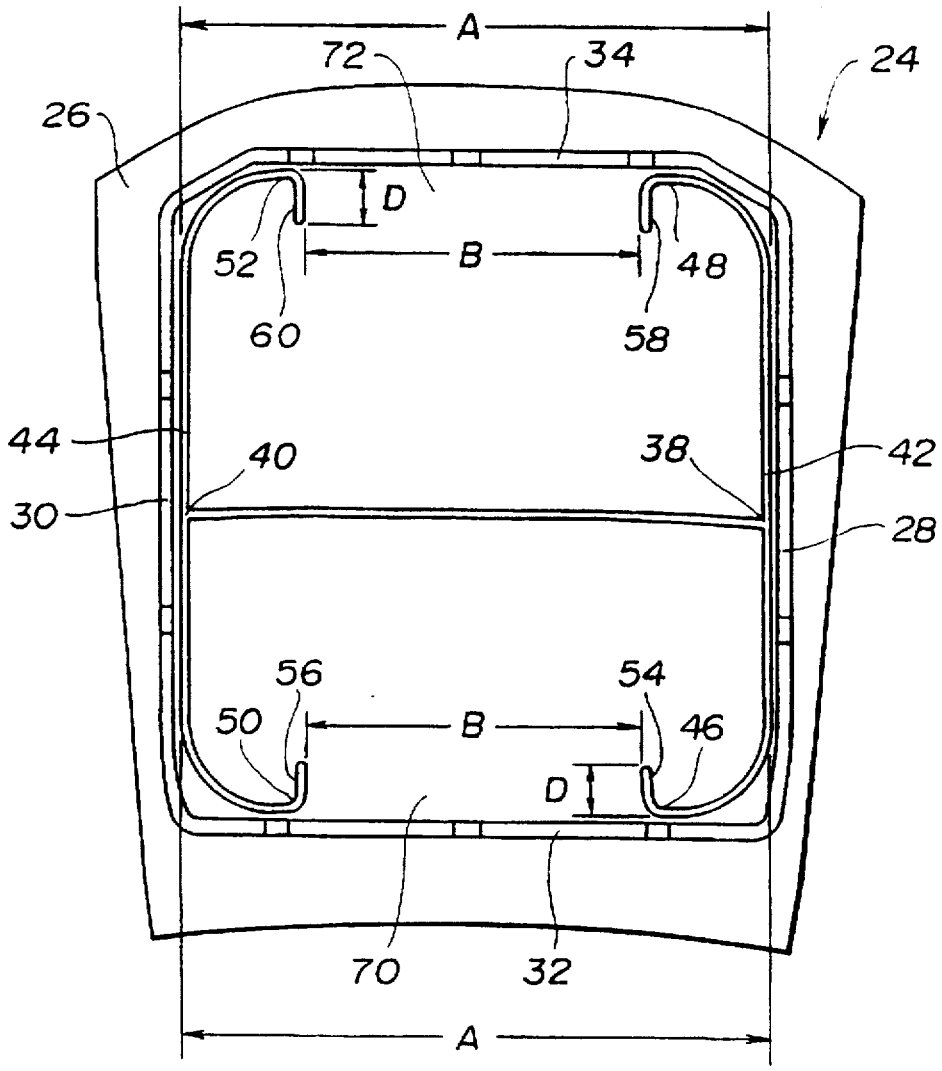
FIG. 6 is a bottom plan view of the container of FIG. 4.

As seen in FIGS. 2, 4 to 6, a first tear line in the form of a groove 36 is located on the inner and outer surfaces of *a substantially planar portion of* the base wall 26. As indicated in a double line in FIGS. 4 and 6, the first tear line in the form of a groove 36 [are] extends across the central part of the inner and outer surfaces of the base wall 26. The first tear line in the form of a groove 36 on the inner surface of the base-wall 26 has opposite ends 38 and 40 inside the side walls 28 and 30 as seen in FIG. 6.

As shown in FIGS. 2 and 6, opposed second tear lines in the form of a groove 42 and 44 are located on the inner surface of *a substantially planar portion of* the base wall 26. As indicated in a chain line in FIGS. 1 and 4, the second tear lines in the form of a groove 42 and 44 extend through the opposite ends 38 and 40 of the first tear line in the form of a groove 36 and along slightly inside the opposite side edges of the base wall 26. The second tear lines in the form of a groove 42 and 44 divert angularly at corner portions of the base wall 26 and extend along opposite upper and lower end edges as viewed in FIG. 6, of the base wall 26. The second tear lines in the form of a groove 42 and 44 terminate at some distance from the opposite side edges of the base wall 26. Thus, the second tear line in the form of a groove 42 has two end portions 46 and 48 which are opposed to those ends 50 and 52 of the second tear line in the form of a groove 44.

Figure 4:
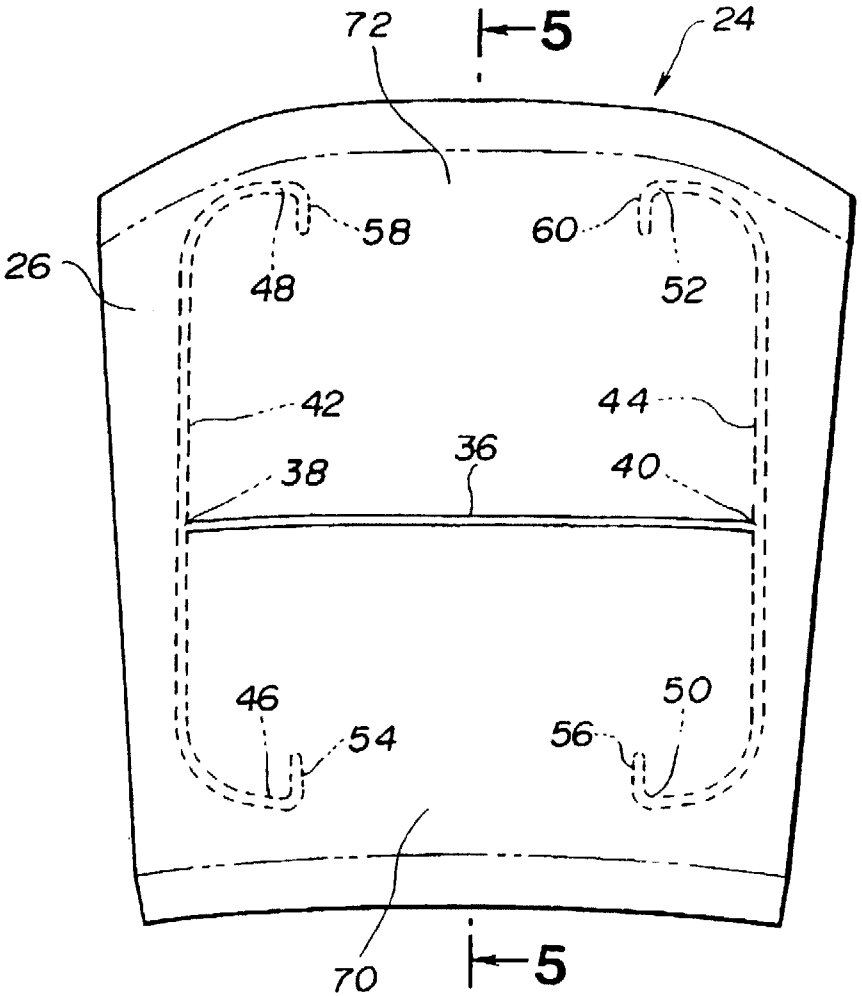
FIG. 4 is a top plan view of the container.

As best shown in FIGS. 4 and 6, third tear lines in the form of a groove 54, 56, 58 and 60 are located on the inner surface of *a substantially planar portion of* the base wall 26 and extend inwardly toward the first tear line in the form of a groove 36, from the opposed end portions 46, 48, 50 and 52 of the second tear lines in the form of a groove 42 and 44, respectively.

The first and second tear lines in the form of a groove 36, 42 and 44 define in the base wall 26 a pair of flaps 74 and 76. The pair of flaps 74 and 76 are forcibly separable from the container 24 for movement between a normally closed position and an open position upon inflation and deployment of the cushion 18.

The third tear lines in the form of a groove 54, 56, 58 and 60 define in the base wall 26 an integrally hinged pair of tongues 70 and 72 forcibly separable from the container 10 upon inflation and deployment of the cushion 18. Each of the tongues 70 and 72 has a hinge line extending between each opposed pair of the third tear lines in the form of a groove 54, 56, and 58, 60. The tongues 70 and 72 are formed integrally with and are rotatable with the pair of flaps 74 and 76 about the hinge lines, respectively.

As shown in FIG. 6, each of the tongues 70 and 72 has a width as indicated at B in FIG. 6, in a direction parallel to the hinge line, and a length as indicated at D in FIG. 6, in a direction perpendicular to the hinge line.

Each of the pair of flaps 74 and 76 has a width as indicated at A in FIG. 6, in a direction parallel to the hinge line. The width A of the flaps 74 and 76 is larger than the width B of the tongues 70 and 72. Thus, the tongues 70 and 72 having the width B and the length D as seen in FIG. 6 have respective areas-smaller than those of the flaps 74 and 76.

The pair of tongues 70 and 72 respectively coextend with the pair of flaps 74 and 76 in any given width of the tongues 70 and 72 such that the tongues 70 and 72 extend less than the flaps 74 and 76 do.

Further, as is appreciated from the above description, the pair of tongues 70 and 72 and the pair of flaps 74 and 76 are located substantially entirely within the base wall 26. The tongues 70 and 72 and the flaps 74 and 76 are separable from the container 24 for movement to the open position upon inflation of the cushion portion 19 of the cushion 18.

The tongues 70 and 72 provide increased flexibility or bending ability of the flaps 74 and 76.

Figure 8:
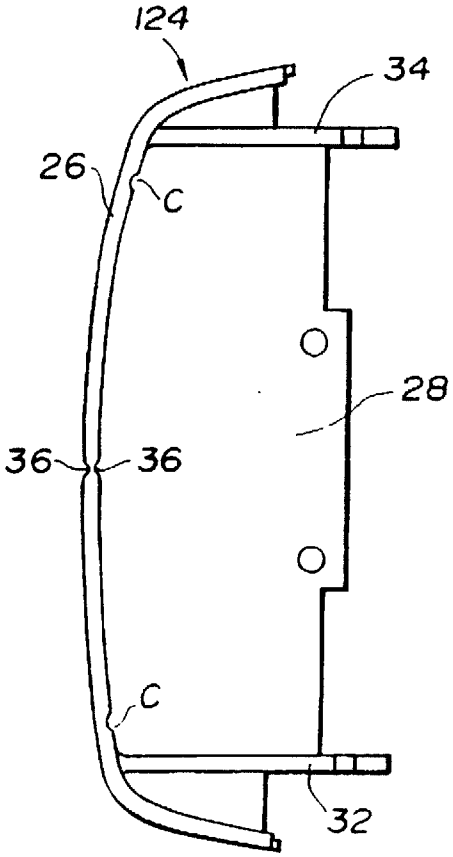
FIG. 8 is a sectional view taken along the line 8—8 of FIG. 7.
Figure 7:
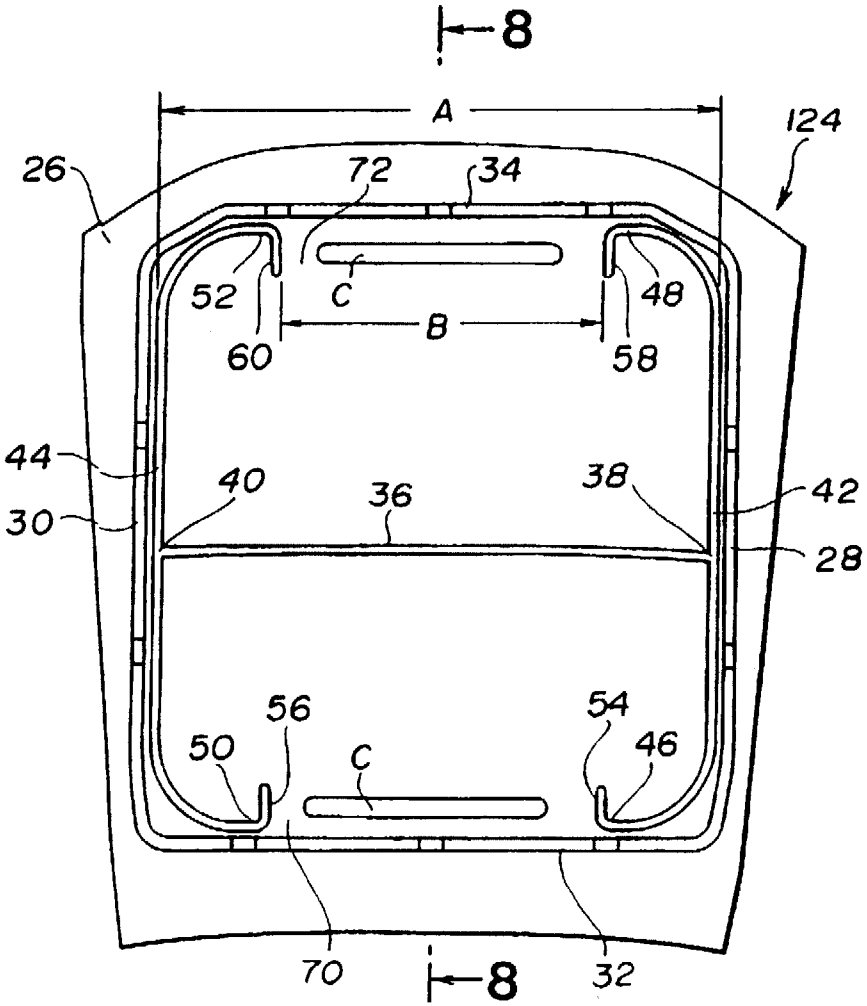
FIG. 7 is a similar view to FIG. 6, showing a modification of a container.

Referring to FIGS. 7 and 8, a modified container 124 is described. The container 124 differs from the container 24 in the provision of recessed portions on the tongues 70 and 72. Therefore, like numerals are used for like parts. The tongues 70 and 72 respectively are formed with recessed portions as indicated at C in FIGS. 7 and 8. The recessed portion C is so arranged and constructed as to have a thickness smaller than that of each of the flaps 74 and 76 and larger than that of the third tear lines in the form of a groove 54, 56, 58 and 60.

When the folded cushion 18 is inflated and deployed by gas generated from the gas generator 14, the cushion portion 19 of the cushion 18 is urged against the inner surface of the base wall 26 of the container 24. When the deployment of the cushion 18 proceeds up to a certain level, the base wall 26 is separated along the first, second and third tear lines in the form of a groove 36, 42 and 44, and 54 to 60, into the flaps 74 and 76 and the tongues 70 and 72. Then, the flaps 74 and 76 and the tongues 70 and 72 rotate together about the hinge lines. The flaps 74 and 76 move to the open position so that the cushion 18 is allowed to deploy through the base wall 26 of the container 24.

Figure 10:
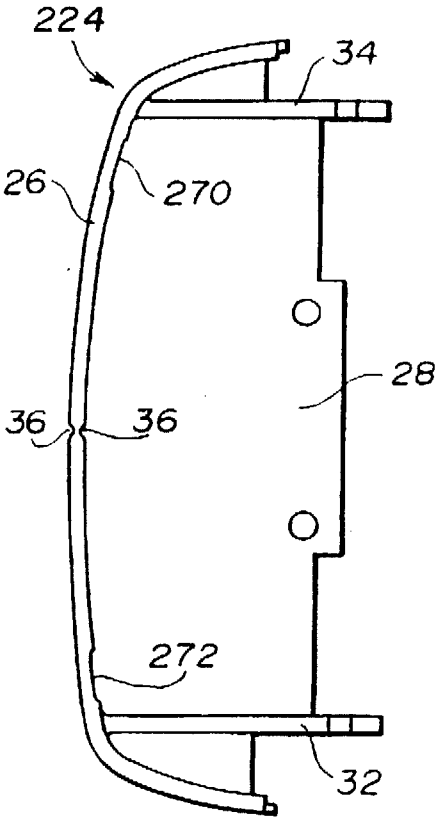
FIG. 10 is a sectional view taken along the line 10—10 of FIG. 9.
Figure 9:
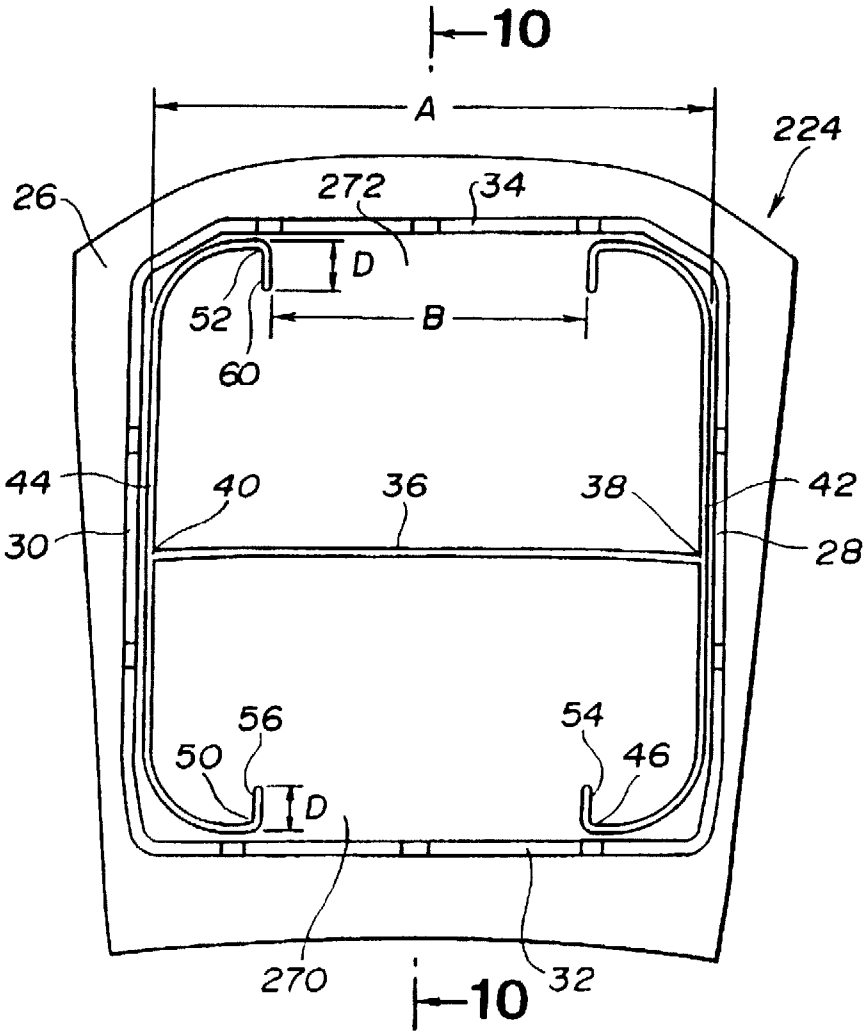
FIG. 9 is a similar view to FIG. 7, showing another modification of a container.

Referring to FIGS. 9 and 10, another modified container 224 is described. The container 224 differs from the container 124 in that the recessed portions are expanded into respective entire areas of the tongues 270 and 272. Therefore, like numerals are used for like parts. The tongues 270 and 272 of the length D have an entire thickness smaller than that of the flaps 74 and 76 and larger than that of the third tear lines in the form of a groove 54, 56, 58 and 60.

Figure 11:
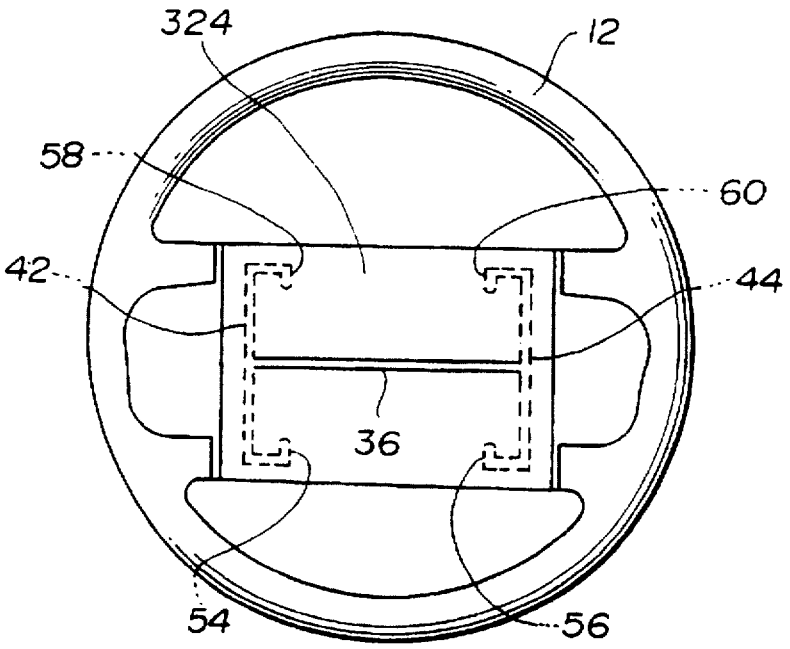
FIG. 11 is a similar view to FIG. 1, showing another embodiment of an occupant restraint system.

Referring to FIG. 11, there is shown another embodiment using a container 324 of a generally rectangular shape. This embodiment is different from the first embodiment only in the configuration of the container. Therefore, like numerals are used for like parts and the detailed explanations thereabout are omitted.

Figure 12:
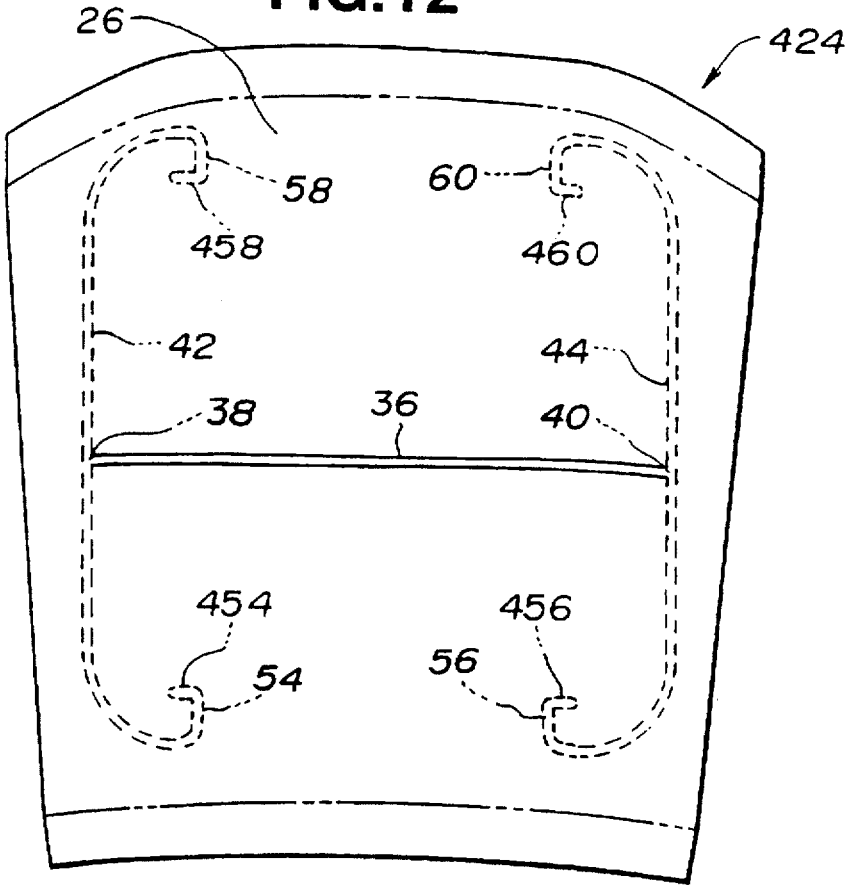
FIGS. 12–14 are top plan views of the other modified containers.

Referring to FIG. 12, there is shown another modified container 424, in which like numerals are used for like parts. The container 424 has fourth tear lines in the form of a groove 454, 456, 458 and 460 extending from ends of the third tear lines in the form of a groove 54, 56, 58 and 60 toward the second tear lines in the form of a groove 42 and 44.

Figure 14:
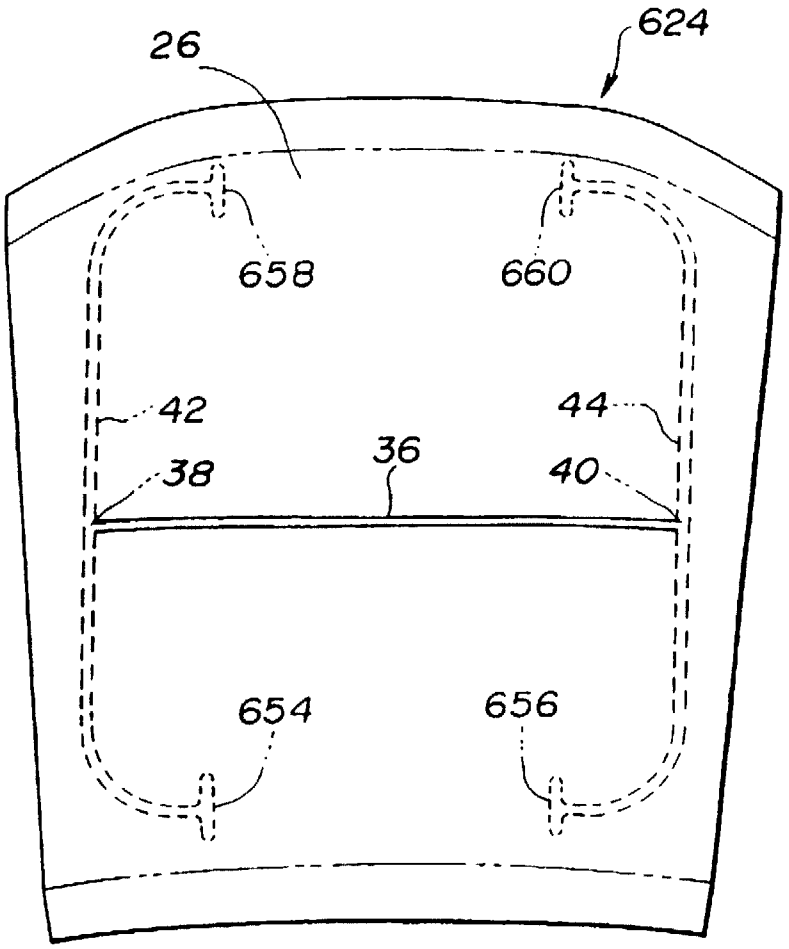
Figure 13:
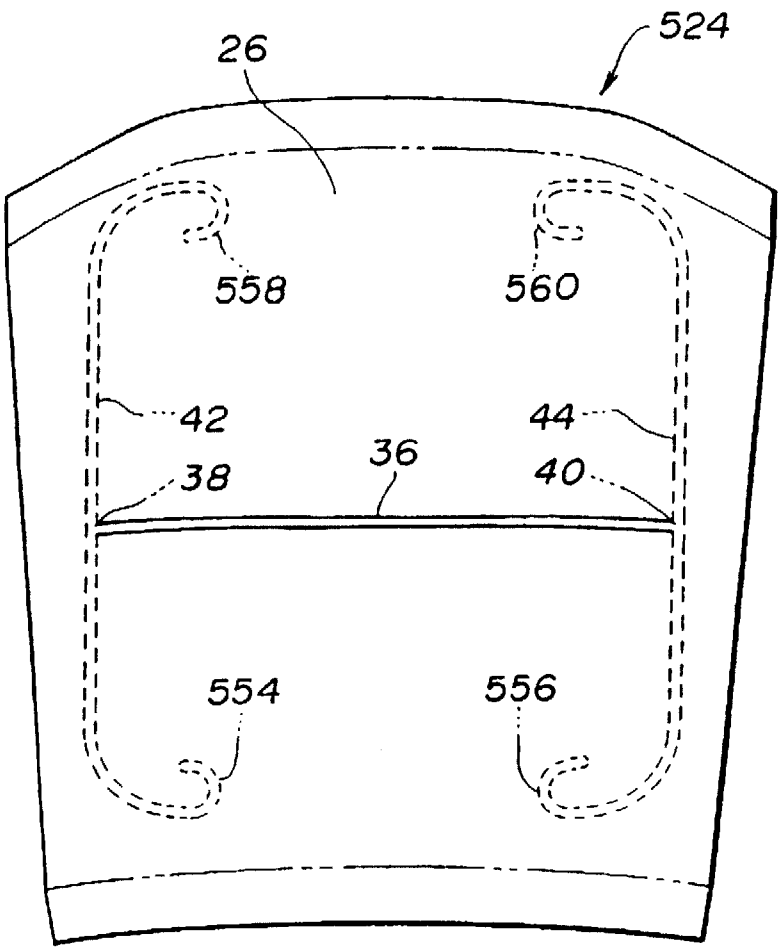

Referring to FIGS. 13 and 14, there are shown other modified containers 524 and 624, which differ only in the configuration of the third tear lines in the form of a groove from the aforementioned embodiments. Therefore, like numerals are used for like parts. The container 524 has the third tear lines in the form of a groove 554, 556, 558 and 560 of a generally arcuate shape. The container 624 has the third tear lines in the form of a groove 654, 656, 658 and 660 of a generally T shape.

What is claimed is:

1. An occupant restraint system comprising:

a container including a base wall, a first pair of spaced side walls joined to said base wall, and a second pair of spaced side walls joined to said base wall;

a folded inflatable occupant restraint cushion within said container, said cushion being folded to provide a cushion portion adjacent said base wall of said container;

a first tear line extending across said base wall and having opposite ends in said base wall;

second tear lines extending through said opposite ends of said first tear line and along a peripheral edge of said base wall, respectively, each of said second tear lines having two ends in said base wall; and third tear lines extending at an angle from said two ends of each of said second tear lines toward said first tear line to define an integrally hinged pair of tongues forcibly separable from said container by said cushion portion of said inflatable cushion, said third tear lines terminate before said first tear line;

said first tear line and said second tear lines cooperating to define a pair of flaps integrally hinged to said pair of tongues and forcibly separable from said container and movable between a normally closed position and an open position by said cushion portion of said inflatable cushion.

2. An occupant restraint system as claimed in claim 1, wherein said tongues have an area smaller than an area of said flaps.

3. An occupant restraint system as claimed in claim 1, wherein said tongues are formed with recessed portions, respectively.

4. An occupant restraint system as claimed in claim 3, wherein said recessed portions have a thickness smaller than a thickness of the flaps and larger than a thickness of the base wall in said first and second tear lines.

5. An occupant restraint system as claimed in claim 1, wherein said tongues have an entire thickness smaller than a thickness of the flaps and larger than a thickness of the base wall in said first and second tear lines.

6. An occupant restraint system as claimed in claim 1, wherein said tongues have a hinge line about which said tongues rotate, and said tongues have a width in a direction parallel to the respective hinge line and a length in a direction perpendicular to the respective hinge line.

7. An occupant restraint system as claimed in claim 6, wherein said flaps include a portion coextending with the length of the corresponding tongues and are larger in length than the corresponding tongues.

8. An occupant restraint system as claimed in claim 1, wherein said first, second and third tear lines are in the form of a groove, respectively.

9. An occupant restraint system as claimed in claim 1, further comprising fourth tear lines extending at an angle from terminal ends of said third tear lines.

10. An occupant restraint system as claimed in claim 1, wherein said third tear [line is] *lines are of* a generally arcuate shape.

11. An occupant restraint system comprising:

a container including a base wall, a first pair of spaced side walls joined to said base wall, and a second pair of spaced side walls joined to said base wall;

a folded inflatable occupant restraint cushion within said container, said cushion being folded to provide a cushion portion adjacent said base wall of said container;

a first tear line extending across said base wall and having opposite ends in said base wall;

second tear lines extending through said opposite ends of said first tear line and along a peripheral edge of said base wall, respectively, each of said second tear lines having two ends in said base wall; and third tear lines extending at an angle from said two ends of each of said second tear lines toward said first tear line to define an integrally hinged pair of tongues forcibly separable from said container by said cushion portion of said inflatable cushion;

said first tear line and said second tear lines cooperating to define a pair of flaps integrally hinged to said pair of tongues and forcibly separable from said container and movable between a normally closed position and an open position by said cushion portion of said inflatable cushion, and wherein the dimension of each said flap that is parallel to said first tear line is larger than the dimension of the respective tongue that is parallel to said first tear line.

12. An occupant restraint system as claimed in claim 11, wherein said tongues have an area smaller than an area of said flaps.

13. An occupant restraint system as claimed in claim 11, wherein said tongues are formed with recessed portions, respectively.

14. An occupant restraint system as claimed in claim 13, wherein said recessed portions have a thickness smaller than a thickness of the flaps and larger than a thickness of the base wall in said first and second tear lines.

15. A occupant restraint system as claimed in claim 11, wherein said tongues have an entire thickness smaller than a thickness of the flaps and larger than a thickness of the base wall in said first and second tear lines.

16. An occupant restraint system as claimed in claim 11, wherein said tongues have a hinge line about which said tongues rotate, and said tongues have a width in a direction parallel to the respective hinge line and a length in a direction perpendicular to the respective hinge line.

17. An occupant restraint system as claimed in claim 11, wherein said first, second and third tear lines are in the form of a groove respectively.

18. An occupant restraint system as claimed in claim 11, further comprising fourth tear lines extending at an angle from terminal ends of said third tear lines.

19. An occupant restraint system as claimed in claim 11, wherein said third tear [line is] *lines are* of a generally arcuate shape.

*20. An occupant restraint system comprising:*

*a container including a base wall, a first pair of spaced side walls Joined to said base wall, and a second pair of spaced side walls Joined to said base wall;*

*a folded inflatable occupant restraint cushion within said container, said cushion being folded to provide a cushion portion adjacent said base wall of said container;*

*a first tear line extending across said base wall and having opposite ends in said base wall;*

*second tear lines extending through said opposite ends of said first tear line and along a peripheral edge of said base wall, respectively, each of said second tear lines having two ends in said base wall; and*

*third tear lines extending at an angle from said two ends of each of said second tear lines toward said first tear line to define an integrally hinged plurality of tongues forcibly separable from said container by said cushion portion of said inflatable cushion, said third tear lines terminating before said first tear line;*

*said first tear line and said second tear lines cooperating to define a plurality of flaps integrally hinged to said plurality of tongues and forcibly separable from said container and movable between a normally closed position and an open position by said cushion portion of said inflatable cushion.*

*21. An occupant restraint system comprising:*

*a container including a base wall, a first pair of spaced side walls joined to said base wall, and a second pair of spaced side walls joined to said base wall;*

*a folded inflatable occupant restraint cushion within said container, said cushion being folded to provide a cushion portion adjacent said base wall of said container;*

*a first tear line extending across said base wall and having opposite ends in said base wall;*

*second tear lines extending through said opposite ends of said first tear line and along a peripheral edge of said base wall, respectively, each of said second tear lines having two ends in said base wall; and*

*third tear lines extending at an angle from said two ends of each of said second tear lines toward said first tear line to define an integrally hinged plurality of tongues forcibly separable from said container by said cushion portion of said inflatable cushion;*

*said first tear line and said second tear lines cooperating to define a plurality of flaps integrally hinged to said plurality of tongues and forcibly separable from said container and movable between a normally closed position and an open position by said cushion portion of said inflatable cushion, and wherein the dimension of each of said plurality of flaps that is parallel to said first tear line is larger than the dimension of each of the plurality of tongues that is parallel to said first tear line.*

*22. An occupant restraint system comprising:*

*a container including a base wall, a first pair of spaced side walls joined to said base wall, and a second pair of spaced side walls joined to said base wall;*

*a folded inflatable occupant restraint cushion within said container, said cushion being folded to provide a cushion portion adjacent said base wall of said container;*

*a first tear line extending across said base wall and having opposite ends in said base wall;*

*second tear lines extending from said opposite ends of said first tear line and along a peripheral edge of said base wall, respectively, each of said second tear lines having an end in said base wall; and*

*third tear lines extending at an angle from the ends of said second tear lines toward said first tear line to define an integrally hinged tongue forcibly separable from said container by said cushion portion of said inflatable cushion, said third tear lines terminating before said first tear line;*

*said first tear line and said second tear lines cooperating to define a flap integrally hinged to said tongue and forcibly separable from said container and movable between a normally closed position and an open position by said cushion portion of said inflatable cushion.*

*23. An occupant restraint system comprising:*

*a container including a base wall, a first pair of spaced side walls joined to said base wall, and a second pair of spaced side walls joined to said base wall;*

*a folded inflatable occupant restraint cushion within said container, said cushion being folded to provide a cushion portion adjacent said base wall of said container;*

*a first tear line extending across said base wall and having opposite ends in said base wall;*

*second tear lines extending from said opposite ends of said first tear line and along a peripheral edge of said base wall, respectively, each of said second tear lines having an end in said base wall; and*

*third tear lines extending at an angle from the ends of said second tear lines toward said first tear line to define an integrally hinged tongue forcibly separable from said container by said cushion portion of said inflatable cushion;*

*said first tear line and said second tear lines cooperating to define a flap integrally hinged to said tongue and forcibly separable from said container and movable between a normally closed position and an open position by said cushion portion of said inflatable cushion, and wherein the dimension of said flap that is parallel to said first tear line is larger than the dimension of the tongue that is parallel to said first tear line.*

*24. An occupant restraint system comprising:*

*a container including a base wall and a pair of spaced side walls joined to said base wall;*

*a folded inflatable occupant restraint cushion within said container, said cushion being folded to provide a cushion portion adjacent said base wall of said container;*

*a first tear line extending across said base wall and having opposite ends in said base wall;*

*second tear lines extending from said opposite ends of said first tear line and along a peripheral edge of said base wall, respectively, each of said second tear lines having an end in said base wall; and*

*third tear lines extending at an angle from the ends of said second tear lines toward said first tear line to define an integrally hinged tongue forcibly separable from said container by said cushion portion of said inflatable cushion, said third tear lines terminating before said first tear line;*

*said first tear line and said second tear lines cooperating to define a flap integrally hinged to said tongue and forcibly separable from said container and movable between a normally closed position and an open position by said cushion portion of said inflatable cushion.*

*25. A container for a folded inflatable occupant restraint cushion for an occupant restraint system comprising:*

*a base wall having a substantially planar portion adapted to contain the folded inflatable occupant restraint cushion, with a cushion portion adjacent said base wall;*

*a first tear line extending across the substantially planar portion of said base wall and having opposite ends in the substantially planar portion of said base wall;*

*second tear lines extending from said opposite ends of said first tear line and along a peripheral edge of said base wall, respectively, each of said second tear lines having an end in the substantially planar portion of said base wall; and*

*third tear lines extending at an angle from the ends of said second tear lines toward said first tear line in the substantially planar portion of the base wall to define an integrally hinged tongue forcibly separable from said base wall by said cushion portion of said inflatable cushion, said third tear lines terminating in the substantially planar portion of the base wall before said first tear line;*

*said first tear line and said second tear lines cooperating to define a flap integrally hinged to said tongue and forcibly separable from said base wall and movable between a normally closed position and an open position by said cushion portion of said inflatable cushion.*

*26. In a container with a base wall, for an occupant restraint system, comprising a tongue and flap disposed in the base wall of the container, wherein the base wall has a substantially planar portion, and wherein the tongue and flap are bounded by:*

*a first tear line having opposite ends in the substantially planar portion;*

*second tear lines extending from said opposite ends of said first tear line, each of said second tear lines having a distal end in the substantially planar portion; and*

*third tear lines extending at an angle from the ends of said second tear lines in the substantially planar portion toward said first tear line to define said tongue which is integrally hinged to said base wall and is adapted to be forcibly separable from said base wall, said third tear lines terminating in the substantially planar portion before said first tear line;*

*wherein said first tear line and said second tear lines cooperate to define said flap which is integrally hinged to said tongue and is adapted to be separable from said base wall and movable between a normally closed position and an open position.*

*27. In an occupant restraint system which includes a container with a base wall having a substantially planar portion, and a foldable occupant restraint cushion within the container, wherein the improvement comprises:*

*a tongue and flat in the base wall which comprises:*

*a first tear line having opposite ends in the substantially planar portion;*

*second tear lines extending from said opposite ends of said first tear line, each of said second tear lines having a distal end in the substantially planar portion; and*

*third tear lines extending in the substantially planar portion at an angle from the distal ends of said second tear lines toward said first tear line to define said tongue which is integrally hinged to said container and is adapted to be forcibly separable from said container, said third tear lines terminating in the substantially planar portion before said first tear line;*

*wherein said first tear line and said second tear lines cooperate to define said flap which is integrally hinged to said tongue and is adapted to be separable from said container and movable between a normally closed position and an open position.*

* * * * *